United States Patent
Zhu et al.

(10) Patent No.: US 12,037,424 B2
(45) Date of Patent: Jul. 16, 2024

(54) ENHANCED, SELF-HEALABLE OR RECOVERABLE AND RECYCLABLE 3D PRINTED ARTICLE AND PREPARATION METHOD AND USE THEREOF

(71) Applicant: INSTITUTE OF CHEMISTRY, CHINESE ACADEMY OF SCIENCES, Beijing (CN)

(72) Inventors: Guangda Zhu, Beijing (CN); Yi Hou, Beijing (CN); Ning Zhao, Beijing (CN); Jian Xu, Beijing (CN)

(73) Assignee: INSTITUTE OF CHEMISTRY, CHINESE ACADEMY OF SCIENCES, Beijing (CN)

( * ) Notice: Subject to any disclaimer, the term of this patent is extended or adjusted under 35 U.S.C. 154(b) by 14 days.

(21) Appl. No.: 17/597,145

(22) PCT Filed: Sep. 11, 2020

(86) PCT No.: PCT/CN2020/114834
§ 371 (c)(1),
(2) Date: Dec. 27, 2021

(87) PCT Pub. No.: WO2021/047649
PCT Pub. Date: Mar. 18, 2021

(65) Prior Publication Data
US 2022/0315673 A1 Oct. 6, 2022

(30) Foreign Application Priority Data

Sep. 12, 2019 (CN) .......................... 201910866553.8
Sep. 12, 2019 (CN) .......................... 201910866554.2
Jan. 20, 2020 (CN) .......................... 202010066454.4

(51) Int. Cl.
*C08F 2/48* (2006.01)
*C08F 220/06* (2006.01)
(Continued)

(52) U.S. Cl.
CPC .............. *C08F 2/48* (2013.01); *C08F 220/06* (2013.01); *B33Y 70/00* (2014.12); *B33Y 80/00* (2014.12)

(58) Field of Classification Search
CPC .. C08F 2/48; C08F 2/50; C08F 220/20; C08F 220/06; C08K 3/16; B33Y 80/00; B33Y 70/00
See application file for complete search history.

(56) References Cited

U.S. PATENT DOCUMENTS

2022/0040914 A1* 2/2022 Deore .................... C08F 220/22
2023/0021553 A1* 1/2023 Sampson ............... B33Y 10/00

FOREIGN PATENT DOCUMENTS

| CN | 103980410 A | 8/2014 |
| CN | 105294936 A | 2/2016 |

(Continued)

OTHER PUBLICATIONS

Ren et al. Highly stretchable dual-cure photosensitive resin for digital light processing printing. J. Appl. Polym. Sci. 2022, 139(27), e52455. (Year: 2022).*

(Continued)

*Primary Examiner* — Sanza L. McClendon
(74) *Attorney, Agent, or Firm* — NKL Law; Allen Xue

(57) ABSTRACT

The present invention discloses an enhanced, self-healable or recoverable and recyclable 3D printed article and a preparation method and use thereof. By introducing a functional monomer into a 3D printing system, a self-healable or recoverable 3D printed article is prepared or the interface strength of the 3D printed article is enhanced; or by using at least one monofunctional thermoplastic photosensitive resin monomer as one of 3D printing raw materials, a recyclable 3D printed article is prepared.

17 Claims, 10 Drawing Sheets

(51) Int. Cl.
    *B33Y 70/00*        (2020.01)
    *B33Y 80/00*        (2015.01)

(56)            References Cited

FOREIGN PATENT DOCUMENTS

| CN | 105936674 A | 9/2016 | | |
|---|---|---|---|---|
| CN | 107312133 A | 11/2017 | | |
| CN | 109782537 A | 5/2019 | | |
| WO | 2017/009184 A1 | 1/2017 | | |
| WO | WO-2020079669 A1 * | 4/2020 | .............. | B22F 10/20 |

OTHER PUBLICATIONS

Highley et al. Direct 3D Printing of Shear-Thinning Hydrogels into Self-Healing Hydrogels. Adv. Mater., 27: 5075-5079 (2015) (Year: 2015).*

Kuang et al. 3D Printing of Highly Stretchable, Shape-Memory, and Self-Healing Elastomer toward Novel 4D Printing. ACS Applied Materials & Interfaces 2018 10 (8), 7381-7388 (Year: 2018).*

Liu et al. Shape Memory Polymers for Body Motion Energy Harvesting and Self-Powered Mechanosensing. Adv. Mater. 2018, 30, 1705195 (Year: 2018).*

Patel et al. Highly Stretchable and UV Curable Elastomers for Digital Light Processing Based 3D Printing. Adv. Mater. 2017, 29, 1606000. (Year: 2017).*

Tuncaboylu et al. Tough and Self-Healing Hydrogels Formed via Hydrophobic Interactions. Macromolecules 2011, 44, 4997-5005 (Year: 2011).*

* cited by examiner

ENHANCED, SELF-HEALABLE OR RECOVERABLE AND RECYCLABLE 3D PRINTED ARTICLE AND PREPARATION METHOD AND USE THEREOF

CROSS-REFERENCE TO RELATED APPLICATIONS

This application is a U.S. national stage application of PCT International Application No. PCT/CN2020/114834, filed Sep. 11, 2020, which claims priority to Chinese Patent Application No. 201910866553.8 filed with China National Intellectual Property Administration on Sep. 12, 2019 and entitled "SELF-HEALABLE OR RECOVERABLE PHOTOCURING 3D PRINTED ARTICLE AND PREPARATION METHOD AND USE THEREOF", Chinese Patent Application No. 201910866554.2 filed with China National Intellectual Property Administration on Sep. 12, 2019 and entitled "METHOD FOR PROMOTING INTERFACE STRENGTH OF 3D PRINTED ARTICLE", and Chinese Patent Application No. 202010066454.4 filed with China National Intellectual Property Administration on Jan. 20, 2020 and entitled "RECYCLABLE PHOTOCURING 3D PRINTED LINEAR POLYMER ARTICLE AND PREPARATION METHOD AND USE THEREOF", the contents of which are incorporated herein by reference in their entirety.

TECHNICAL FIELD

The present invention relates to the technical field of 3D printing, and particularly relates to an enhanced, self-healable or recoverable and recyclable 3D printed article and preparation method and use thereof.

BACKGROUND 3D printing is an emerging prototyping technology that is capable of processing articles featuring complex structure and high prototyping precision requirements, and is currently widely used in fields of tissue engineering, soft robots and the like. Photocuring 3D printing is an important direction of 3D printing technology, which uses photosensitive resin as raw material. It is characterized by high prototyping precision, high printing efficiency, etc., and can realize the printing of micron-scale, submicron-scale or even nano-scale structures. However, most of the materials used for photocuring 3D printing are thermosetting photosensitive resin materials. If a printed article is damaged by the outside environment, its complex structure is difficult to restore, and its performance will also decline, which makes it difficult to meet the actual use requirements. Meanwhile, the photocuring 3D printed article cannot be recovered and is difficult to process again for prototyping, which will lead to problems such as environmental pollution, resource wastage and the like.

As a result, recoverable and reprocessable photocuring 3D printing materials have aroused widespread interest. However, in the prior art, photocuring 3D printing usually uses monomers comprising at least multifunctional thermosetting photosensitive resin as raw materials, which form covalently cross-linked articles through photocuring. However, the covalently cross-linked 3D printed articles cannot be recovered and is difficult to process again for prototyping, which will lead to problems such as environmental pollution, resource wastage and the like.

3D printing, also known as additive manufacturing, is a technology that manufactures physical articles by computer-controlled layer-by-layer accumulation of materials. Compared with the traditional processing technology, 3D printing technology does not involve traditional multiple processing procedures and can quickly manufacture parts with complex structures, which greatly reduces the processing procedures and shortens the processing cycle, and the more complex the structure of an article is, the more significant the processing efficiency is. Due to its high efficiency and high precision, 3D printing technology is widely used in the fields of aerospace, medical treatment, art design and the like. However, the inherent layer-by-layer accumulation processing mode of the 3D printing technology leads to weak bonding force between layers, and thus defects are easy to be generated and the performance is significantly reduced compared with that of a traditional processed article, which makes it difficult to meet the actual use requirements.

SUMMARY

The present invention provides a 3D printed article, wherein raw materials for 3D printing of the 3D printed article comprise a functional monomer or at least one monofunctional thermoplastic photosensitive resin monomer, wherein the functional monomer is selected from at least one of a compound with a structural formula shown in formula (I) and a compound containing dynamic chemical bonds:

$$M_xR_y \qquad \text{formula (I)}$$

in formula (I), M is selected from a metal ion, and R is selected from an anion;

n is the valence number of the metal ion, m is the valence number of the anion, $x=1$ and $y=n/m$ if $n/m$ is an integer, and $x=m$ and $y=n$ if $n/m$ is not an integer.

Further, the present invention provides a preparation method of a 3D printed article, wherein the method comprises:

introducing a functional monomer into a 3D printing system to obtain a self-healable or recoverable 3D printed article, or introducing a functional monomer into a 3D printing system to obtain a 3D printed article with enhanced interface strength, or preparing a recyclable 3D printed article by using at least one monofunctional thermoplastic photosensitive resin monomer as one of 3D printing raw materials, wherein the functional monomer is selected from at least one of a compound with the structural formula shown in formula (I) described above and a compound containing dynamic chemical bonds.

The metal ion is selected from Cu ion, Fe ion, Mg ion, Ca ion, Mn ion, Zn ion, rare earth metal ion and the like; the anion is selected from chloride ion, bromide ion, sulfate ion, nitrate ion, imidazole anion, $R_1CH=C(R_2)—COO$ ion and the like, wherein $R_1$ is selected from H and alkyl, and $R_2$ is selected from H and methyl.

In a first aspect, the present invention provides a composition used for the 3D printed article described above, in particular a composition used for preparing a self-healable or recoverable article through photocuring 3D printing, which comprises at least one photosensitive resin monomer, a photoinitiator and a functional monomer, wherein the photosensitive resin monomer is a monofunctional photosensitive compound;

the functional monomer is selected from at least one of a compound with the structural formula shown in formula (I) described above and a compound containing dynamic chemical bonds.

According to the technical solution of the present invention, the composition can contain a nanoparticle.

The present invention further provides use of the composition described above in preparation of a photocuring 3D printed article.

The present invention further provides a photocuring 3D printed article prepared from the composition described above.

The present invention further provides a preparation method of the 3D printed article described above, specifically a preparation method of a self-healable or recoverable 3D printed article, which comprises:

1a) blending at least one photosensitive resin monomer with a photoinitiator to obtain a solution;

2a) adding a functional monomer, and optionally a nanoparticle, into the solution to obtain a mixed dispersion; and 3a) subjecting the mixed dispersion obtained in step 2a) to photocuring 3D printing to obtain the photocuring 3D printed article.

The photosensitive resin monomer, the photoinitiator, the functional monomer and the nanoparticle are defined as above.

The present invention further provides a self-healing method of the 3D printed article described above, which comprises bonding fracture surfaces of a damaged printed article together and subjecting the article to healing at a certain temperature, thus allowing the article to restore its structure and performance.

The present invention further provides a recovering method of the 3D printed article, which comprises cutting a damaged printed article into pieces and performing hot-pressing treatment, thus obtaining a recovered material.

In a second aspect, the present invention provides a composition used for the 3D printed article described above, specifically a composition used for preparing a photocuring 3D printed linear polymer article, which comprises at least one photosensitive resin monomer, a photoinitiator, and optionally a filler, wherein the photosensitive resin monomer is a monofunctional thermoplastic photosensitive resin monomer.

The present invention further provides use of the composition described above in preparation of a photocuring 3D printed linear polymer article.

The present invention further provides a photocuring 3D printed linear polymer article prepared from raw materials comprising the composition described above.

The present invention further provides a preparation method of the photocuring 3D printed linear polymer article described above, which comprises 1b) blending at least one photosensitive resin monomer with a photoinitiator to obtain a resin solution;

2b) optionally, adding a filler to the resin solution to obtain a mixed dispersion; and 3b) subjecting the resin solution obtained in the step 1b) or the mixed dispersion obtained in the step 2b) to photocuring 3D printing to obtain the photocuring 3D printed linear polymer article.

The present invention further provides a recovering method of the photocuring 3D printed linear polymer article described above, which comprises adding the 3D printed linear polymer article into a photosensitive resin monomer and dissolving the 3D printed linear polymer article by stirring at a certain temperature to form a solution containing the photosensitive resin monomer, wherein the photosensitive resin monomer is the same as that used for preparing the photocuring 3D printed linear polymer article.

The present invention further provides a cyclic printing method of the photocuring 3D printed linear polymer article, which comprises a) adding a 3D printed linear polymer article into a photosensitive resin monomer and dissolving the 3D printed linear polymer article by stirring at a certain temperature to form a solution containing the photosensitive resin monomer;

b) blending the solution containing the photosensitive resin monomer described above with a photoinitiator to obtain a resin solution;

c) optionally, adding a filler to the resin solution to obtain a mixed dispersion; and d) subjecting the solution obtained in the step b) or the mixed dispersion obtained in the step c) to photocuring 3D printing to obtain the photocuring 3D printed linear polymer article again.

The present invention further provides a recovering method of the filler in the photocuring 3D printed linear polymer article, which comprises centrifuging the solution containing the photosensitive resin monomer described above obtained by the recovering method of the photocuring 3D printed linear polymer article described above to enable the filler to be agglomerated at the bottom, and taking out the filler and washing and drying.

In a third aspect, the present invention provides a method for improving interface strength of a 3D printed article, which comprises (1c) introducing a functional monomer into a 3D printing material system and performing 3D printing to obtain a printed article; and (2c) performing activation treatment on the printed article obtained in the step (1c) to improve the interface strength of the printed article; wherein the functional monomer is introduced into the material system in a mode such that the functional monomer is blended with other materials in the system, wherein the other materials comprise polymers, and the polymers contain at least one of oxygen, nitrogen, sulfur, boron and phosphorus;

the functional monomer is selected from at least one of a compound with the structural formula shown in formula (I) described above and a compound containing dynamic chemical bonds, and the functional monomer is preferably at least one of zinc chloride, ferric chloride and zinc acrylate.

According to the technical solution of the present invention, the interface refers to an interface formed between layers, between filaments or between particles in an article. FIG. 9 shows a schematic diagram illustrating introducing interface interaction to enhance the inter-layer bonding force of a printed article.

According to the technical solution of the present invention, the 3D printing is at least one of fused deposition (FDM), selective heat sintering (SHS), selective laser sintering (SLS), stereolithography (SLA), laminated object manufacturing (LOM), digital light processing (DLP) and direct ink writing (DIW), for example, fused deposition (FDM), digital light processing (DLP), or direct ink writing (DIW).

Further, when a digital light processing printing mode is selected for the 3D printing, the laser used in the printing process is visible light or ultraviolet light, wherein the wavelength range of the visible light is 415-780 nm, such as 430-600 nm, and exemplarily 445 nm, and the wavelength range of the ultraviolet light is 265-420 nm, such as 300-400 nm. Curing time per layer is 1-900 s, such as 10-400 s, or further 20-100 s, and exemplarily 10 s, 20 s or 60 s. Each layer has a layer thickness of 5-100 μm, such as 20-80 μm, and exemplarily 80 μm.

When a direct ink writing printing mode or a fused deposition printing mode is selected for the 3D printing, the diameter of a printing head is 50-100 μm, and a printing speed is 5-20 mm/s; for example, the diameter of the printing head is 60-80 μm, and the printing speed is 10-20 mm/s; exemplarily, the diameter of the printing head is 70 μm or 100 μm and the printing speed is 10 mm/s.

For the fused deposition printing mode, the temperature for melting and blending the materials is 120-220° C., such as 150-200° C., and exemplarily 180° C.

According to the technical solution of the present invention, the activation treatment is at least one of heat treatment, light irradiation treatment and electric treatment, preferably heat treatment. For example, the temperature of heat treatment is 20-200° C., such as 30-160° C. or further 80-150° C., and exemplarily 100° C. or 150° C. The time of the heat treatment is 1 min to 48 h, such as 0.5-36 h or further 3-15 h, and exemplarily 5 h or 6 h.

According to the technical solution of the present invention, the polymer is at least one of polymer powder, polymer wire, polymer film and liquid photosensitive resin.

The polymer of the polymer powder, the polymer wire and the polymer film can be selected from at least one of the following polymers: polylactic acid, polyetheretherketone, polyurethane, polycarbonate, polymethyl methacrylate, polyvinyl alcohol, ethylene-vinyl acetate copolymer, acrylate copolymer, nylon, acrylonitrile-butadiene-styrene copolymer (ABS), polyterephthalic acid plastic (e.g., polyethylene terephthalate (PET), polybutylene terephthalate (PBT)), and the like, preferably at least one of polymethylmethacrylate, polyvinyl alcohol and ethylene-vinyl acetate copolymer.

The liquid photosensitive resin is selected from at least one of the following resins: polyepoxy acrylate, unsaturated polyester, polyurethane acrylate, polyester acrylate, polyether acrylate, polyacrylate and photocuring organosilicon oligomer. Preferably, the photosensitive resin is obtained by polymerization of raw materials including a photosensitive resin monomer. For example, the photosensitive resin monomer may be selected from at least one of acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, lauryl methacrylate, cyclohexyl acrylate, cyclohexyl methacrylate, ethoxyethyl acrylate, and 1,3-propanediol monoacrylate, preferably at least one of acrylic acid, hydroxyethyl acrylate, hydroxyethyl methacrylate, polyurethane acrylate and cyclohexyl acrylate, and more preferably at least one of acrylic acid, hydroxyethyl acrylate and hydroxyethyl methacrylate.

According to the technical solution of the present invention, when the liquid photosensitive resin is selected, the material system may further comprise a photoinitiator. The photoinitiator is selected from at least one of dibenzoyl, diphenylethanedione, dialkoxyacetophenone, camphorquinone, α-hydroxyalkyl phenyl ketones (e.g., HMPP, HHMP, HCPK), α-aminoalkyl phenyl ketones (e.g., Irgacure907, Irgacure369), acylphosphine oxides (e.g., TPO, TEPO, BAPO), benzophenone, 4-methylbenzophenone, 2,4,6-trimethylbenzophenone, triethanolamine, N-methylethanolamine, N,N-dimethylethanolamine, N,N-diethylethanolamine, quinone compounds, titanocene compounds, iodonium salt compounds, sulfonium salt compounds, and triazine compounds. Further, the material system may further comprise a polymerization inhibitor, wherein the polymerization inhibitor is selected from conventional polymerization inhibitors in the art, such as hydroquinone. Further, the material system may further comprise a cross-linking agent, wherein the cross-linking agent is selected from conventional cross-linking agents in the art, such as hexanediol diacrylate. Further, the photoinitiator, the polymerization inhibitor and the cross-linking agent are used in amounts conventional in the art.

According to the technical solution of the present invention, the mass ratio of the functional monomer to the polymer is 1:(10-150), such as 1:(50-120), and exemplarily 1:10, 1:100 or 1:105.

According to the technical solution of the present invention, the material system can contain a nanoparticle. For example, the nanoparticle is selected from at least one of silica, ferroferric oxide, titanium dioxide, montmorillonite, boron nitride, graphene, molybdenum disulfide, graphene oxide and carbon nanotube; preferably, the nanoparticle is at least one of graphene, silica and montmorillonite. Further, the mass ratio of the nanoparticle to the polymer is 1:(10-250), such as 1:(20-220), and exemplarily 1:20, 1:200 or 1:211.

According to the technical solution of the present invention, the material system may also comprise other components suitable to be contained in the material system of corresponding 3D printing method, such as at least one of liquid metal, pigment and the like. The liquid metal may be at least one of gallium indium alloy, LM105 liquid metal alloy and the like; the pigment may be selected from at least one of carbon black, turmeric, and other pigments known in the art.

In the technical solution described above, the functional monomer is selected from at least one of ferric nitrate, copper nitrate, magnesium nitrate, copper chloride, manganese nitrate, zinc nitrate, calcium nitrate, calcium chloride, ferric chloride, europium nitrate, chromium nitrate, cerium nitrate, chromium chloride, cerium chloride, zinc chloride, manganese chloride, magnesium chloride, ferric methacrylate, zinc acrylate, zinc methacrylate, zinc dimethacrylate, and copper methacrylate.

In the technical solution described above, the dynamic bonds in the compound containing dynamic bonds can be divided into dynamic noncovalent bond and dynamic covalent bond, and the dynamic noncovalent bond is selected from one or more of hydrogen bond, π-π stacking, electrostatic interaction, metal coordination, host-guest interaction and the like; the dynamic covalent bond is selected from one or more of imine bond, boron ester bond, acetal, Diels-Alder reaction, cycloaddition, urea bond, ester exchange, oxime urethane bond and the like.

Beneficial Effects of the Present Invention

The present invention realizes the enhancement, healing, recovery and recycling of the photocuring 3D printing material by utilizing the dynamic chemical bond for the first time, and has great application prospect.

The self-healable or recoverable photocuring 3D printed article provided in the first aspect of the present invention has the following advantages:

1. The preparation process of the composition used for preparing the self-healable or recoverable photocuring 3D printed article is simple, in which the composition can be prepared only by adding and stirring the components at room temperature.

2. The method for preparing the photocuring 3D printed article disclosed herein has universality and any monofunctional photosensitive compound monomer can be used for preparing the self-healing and recoverable photocuring 3D printed article.

3. The photocuring 3D printed article disclosed herein is good in mechanical property, simple in self-healing and recovering methods, and capable of maintaining good mechanical property after being healed, so that the photocuring 3D printing material can be repeatedly used, and resource wastage and environmental pollution are reduced.

The composition used for preparing the recyclable photocuring 3D printed linear polymer article provided in the second aspect of the present invention has the following advantages:

1. The preparation process of the composition used for preparing the recyclable photocuring 3D printed linear polymer article is simple, in which the composition can be prepared only by adding and stirring the components at room temperature.

The combination of a monofunctional thermoplastic photosensitive resin monomer and a filler can impart at least one of heat, electricity, magnetism and other functions to the article, so that the mechanical property of the material is enhanced.

2. The photocuring 3D printed linear polymer article disclosed herein can meet the requirements of photocuring printing, the reuse method of the article is simple, the original performance can be kept, and the photocuring 3D printing can be performed multiple times, so that the recycling of materials is realized (the times of recycling are not limited and the material can be recycled all the time as required; research results show that the structure and physical and mechanical properties of the article can be basically kept unchanged after recycling of 3 times or more, and thus the article has great prospect in practical application), and the resource wastage and environmental pollution are reduced.

3. The photocuring 3D printed linear polymer article disclosed herein realizes efficient utilization as it can realize the recovery of filler, which is beneficial to reducing the cost.

The method for improving the interface strength of the 3D printed article provided in the third aspect of the present invention has the following advantages:

1. The preparation process of the raw materials of the 3D printed article is simple, in which the materials can be prepared by only blending the functional monomer and a material system comprising a polymer for 3D printing;

2. The method has universality as it is suitable for various 3D printing modes and various polymer materials;

3. The activation mode is simple, and the mechanical property of the 3D printed article can be effectively improved. According to the present invention, the functional monomer is introduced into the material system for 3D printing and then the article is activated after 3D printing, so that the mechanical property of the polymer is improved and thereby inter-layer bonding force of the 3D printed article is enhanced, and thus the performance of the 3D printed article is effectively promoted.

DETAILED DESCRIPTION

Figure 1:
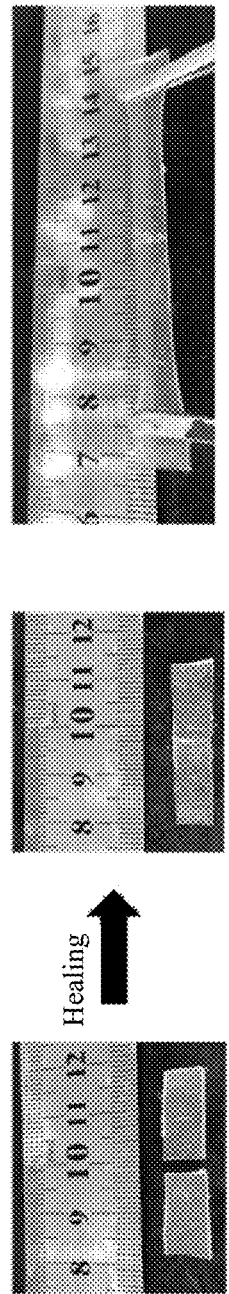
FIG. 1 shows photographs of the sample prepared in Example A1 before and after healing.

The first aspect of the present invention specifically relates to the following content.

[Composition]

The present invention provides a composition for preparing a self-healable or recoverable article through photocuring 3D printing, which comprises a photosensitive resin monomer, a photoinitiator and a functional monomer, wherein the photosensitive resin monomer is a monofunctional photosensitive compound;

the functional monomer is selected from at least one of a compound with a structural formula shown in formula (I) and a compound containing dynamic chemical bonds:

$$M_xR_y \quad \text{formula (I)}$$

in formula (I), M is selected from a metal ion, and R is selected from an anion;

n is the valence number of the metal ion, m is the valence number of the anion, x=1 and y=n/m if n/m is an integer, and x=m and y=n if n/m is not an integer.

The metal ion is selected from Cu ion, Fe ion, Mg ion, Ca ion, Mn ion, Zn ion, rare earth metal ion and the like; the anion is selected from chloride ion, bromide ion, sulfate ion, nitrate ion, imidazole anion, $R_1CH\!=\!C(R_2)\!-\!COO$ ion and the like, wherein $R_1$ is selected from H and alkyl (or further preferably selected from $C_{1-6}$ alkyl, such as methyl, ethyl, n-propyl, isopropyl, n-butyl, isobutyl, tert-butyl, n-pentyl, isopentyl, n-hexyl, isohexyl), and $R_2$ is selected from H or methyl.

Specifically, the functional monomer is selected from at least one of ferric nitrate, copper nitrate, magnesium nitrate, copper chloride, manganese nitrate, zinc nitrate, calcium nitrate, calcium chloride, ferric chloride, europium nitrate, chromium nitrate, cerium nitrate, chromium chloride, cerium chloride, zinc chloride, manganese chloride, magnesium chloride, ferric methacrylate, zinc acrylate, zinc methacrylate, zinc dimethacrylate, and copper methacrylate. Preferably, the functional monomer is at least one of copper chloride, ferric chloride, magnesium chloride, chromium chloride, zinc chloride, magnesium nitrate, zinc acrylate, zinc methacrylate and zinc dimethacrylate.

The dynamic bonds in the compound containing dynamic bonds can be divided into dynamic noncovalent bond and dynamic covalent bond, and the dynamic noncovalent bond is selected from one or more of hydrogen bond, π-π stacking, electrostatic interaction, metal coordination, host-guest interaction and the like; the dynamic covalent bond is selected from one or more of imine bond, boron ester bond, acetal, Diels-Alder reaction, cycloaddition, urea bond, ester exchange, oxime urethane bond and the like. For example, the compound containing dynamic bonds may be selected from at least one of 2,2-dithiodiethanol diacrylate, benzyl acrylate, 2,4,6-tribromophenyl acrylate, methacryloyloxyethyltrimethyl ammonium chloride, 9-anthracenylmethyl acrylate, acryloyloxyethyltrimethyl ammonium chloride, 2-(perfluorobutyl)ethyl acrylate, 9,9-bis [4-(2-acryloyloxyethoxy)phenyl]fluorene, 2-propenoic acid-(4-methyl-1,3-phenylene) bis(iminocarboxyl-2,1-ethanediyl)ester, 2-[[(butylamino)carbonyl]oxy]ethyl acrylate, 2-hydroxy-3-phenoxypropyl acrylate, tris-2-propenoic acid [2,4,6-trioxo-1,3,5-triazine-1,3,5(2H,4H,6H)-ylidene]tris-2,1-ethylene ester, and the like.

According to the technical solution of the present invention, the photosensitive resin monomer may be selected from at least one of acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, isobornyl acrylate, lauryl methacrylate, cyclohexyl acrylate, cyclohexyl methacrylate, ethoxyethyl acrylate, and 1,3-propanediol monoacrylate, preferably at least one of acrylic acid, hydroxyethyl acrylate, isobornyl acrylate, hydroxyethyl methacrylate, polyurethane acrylate and cyclohexyl acrylate, and more preferably at least one of acrylic acid, hydroxyethyl acrylate, isobornyl acrylate, monofunctional polyurethane acrylate and hydroxyethyl methacrylate.

According to the technical solution of the present invention, the photoinitiator is selected from at least one of dibenzoyl, diphenylethanedione, dialkoxyacetophenone, camphorquinone, α-hydroxyalkyl phenyl ketones (e.g., HMPP, HHMP, HCPK), α-aminoalkyl phenyl ketones (e.g., Irgacure907, Irgacure369), acylphosphine oxides (e.g., TPO, TEPO, BAPO), benzophenone, 4-methylbenzophenone, 2,4,6-trimethylbenzophenone, triethanolamine, N-methylethanolamine, N,N-dimethylethanolamine, N,N-diethylethanolamine, quinone compounds, titanocene compounds, iodonium salt compounds, sulfonium salt compounds, and triazine compounds; preferably, the photoinitiator is selected from at least one of camphorquinone, 2,4,6-trimethylbenzophenone, 4-methylbenzophenone and N-methylethanolamine; more preferably, the photoinitiator is camphorquinone and/or 2,4,6-trimethylbenzophenone.

According to the technical solution of the present invention, the composition can contain a nanoparticle. For example, the nanoparticle is selected from at least one of silica, ferroferric oxide, titanium dioxide, montmorillonite, boron nitride, graphene, molybdenum disulfide, graphene oxide and carbon nanotube; preferably, the nanoparticle is selected from at least one of silica, carbon nanotube, montmorillonite, graphene oxide, titanium dioxide and boron nitride.

According to the technical solution of the present invention, the mass ratio of the functional monomer to the photosensitive resin monomer is (0.05-5):100, preferably (0.5-3):100, such as 0.5:100, 1:100, or 2:100.

According to the technical solution of the present invention, the mass ratio of the photoinitiator to the photosensitive resin monomer is (0.01-5):100, preferably (0.1-3):100, and more preferably (0.5-2):100; for example, the mass ratio is 1:100 or 1.5:100.

According to the technical solution of the present invention, the mass ratio of the nanoparticle to the photosensitive resin monomer is (0.01-20):100, preferably (0.1-10):100, and more preferably (0.5-5):100; for example, the mass ratio is 0.1:100, 1:100, or 2:100.

[Use]

The present invention further provides use of the composition described above in preparation of a photocuring 3D printed article.

[Self-Healable or Recoverable Photocuring 3D Printed Article]

The present invention further provides a photocuring 3D printed article prepared from the composition described above through photocuring 3D printing.

The article is healable or recoverable. Specifically, the article can restore its structure and performance after healing. Furthermore, the article prepared after recovering has properties similar or identical to those of the original article.

[Preparation Method of Photocuring 3D Printed Article]

The present invention further provides a preparation method of the photocuring 3D printed article, which comprises 1a) blending at least one photosensitive resin monomer with a photoinitiator to obtain a solution;

2a) adding a functional monomer, and optionally a nanoparticle, into the solution to obtain a mixed dispersion; and 3a) subjecting the mixed dispersion obtained in step 2a) to photocuring 3D printing to obtain the photocuring 3D printed article.

The photosensitive resin monomer, the photoinitiator, the functional monomer and the nanoparticle, as well as the mass ratios thereof, are defined as above.

According to the preparation method of the present invention, the preparation of the solution in the step (1a) and/or the step (2a) is performed under stirring. Further, the step (1a) and/or the step (2a) are performed at room temperature. The room temperature refers to a temperature of 15-40° C., such as 20-35° C.

According to the preparation method of the present invention, the photocuring 3D printing is performed by using equipment known in the art. For example, Creality 3D, ZRapid SLA500, Xiaofang ONE and other 3D printers can be used.

According to the preparation method of the present invention, the laser used in the photocuring 3D printing process is visible light or ultraviolet light. The wavelength range of the visible light is 415-780 nm, such as 430-600 nm, and exemplarily 445 nm. The wavelength range of the ultraviolet light is 265-420 nm, such as 300-400 nm.

According to the preparation method of the present invention, in the photocuring 3D printing process, the curing time per layer is 1-900 s, such as 10-400 s, or further 20-100 s, and exemplarily 10 s, 20 s or 60 s.

According to the preparation method of the present invention, in the photocuring 3D printing process, each layer has a layer thickness of 5-100 μm, such as 10-60 μm, and exemplarily 50 μm.

[Self-Healing Method of Photocuring 3D Printed Article]

The present invention further provides a self-healing method of the photocuring 3D printed article, which comprises bonding fracture surfaces of a damaged printed article together and subjecting the article to healing at a certain temperature, thus allowing the article to restore its structure and performance.

The temperature is in the range of 20-200° C., such as 30-160° C. or further 50-130° C., and exemplarily 80° C. or 120° C.

The time of the healing is 1 min to 48 h, such as 0.5-36 h or further 1-24 h, and exemplarily 1 h, 6 h or 12 h.

[Recovering Method of Photocuring 3D Printed Article]

The present invention further provides a recovering method of the photocuring 3D printed article, which comprises cutting a damaged printed article into pieces and performing hot-pressing treatment, thus obtaining a recovered material.

The pressure of the hot-pressing treatment is 5-10 MPa, such as 6-8 MPa, and exemplarily 7 MPa or 8 MPa.

The temperature of the heat-pressing treatment is 80-200° C., such as 100-160° C., and exemplarily 120° C. or 150° C.

The time of the hot-pressing treatment is 10 min to 6 h, such as 30 min to 4 h, and exemplarily 2 h or 3 h.

The second aspect of the present invention specifically relates to the following content.

[Composition for Preparing Photocuring 3D Printed Linear Polymer Article]

As described above, the present invention provides a composition for preparing a photocuring 3D printed linear polymer article, which comprises at least one photosensitive resin monomer, a photoinitiator, and optionally a filler, wherein the photosensitive resin monomer is a monofunctional thermoplastic photosensitive resin monomer.

In a specific embodiment, the composition consists of at least one photosensitive resin monomer, a photoinitiator, and optionally a filler, wherein the photosensitive resin monomer is a monofunctional thermoplastic photosensitive resin monomer.

Preferably, the monofunctional thermoplastic photosensitive resin monomer is selected from at least one of a compound of formula (1) and a compound of formula (2);

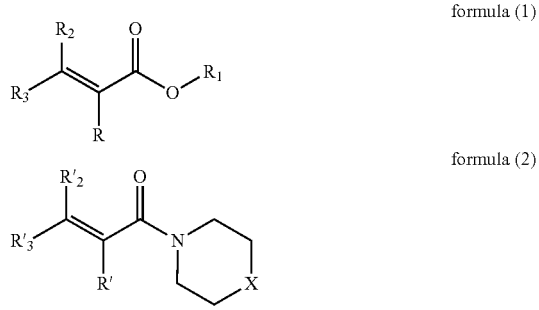

in the formula (1), $R_1$ is selected from H and one of the following substituted or unsubstituted groups: alkyl (such as $C_{1-20}$ alkyl, or further $C_{1-12}$ alkyl, or even further methyl, ethyl, propyl, butyl, hexyl, dodecyl, etc.), cycloalkyl (such as $C_{3-20}$ cycloalkyl, or further $C_{3-12}$ cycloalkyl, or even further cyclopropyl, cyclobutyl, cyclopentyl, cyclohexyl, etc.), a heterocyclic ring (such as tetrahydrofuran), a bridged ring (such as isobornyl), and a polyurethane group, wherein the substituent is selected from hydroxy, alkoxy or norbornenyl; or $R_1$ is alkoxylated groups of the groups described above, for example, an ethoxylated tetrahydrofuran group;

$R_2$ and $R_3$ are the same or different and are each independently selected from H, alkyl and aryl;

R is selected from H, methyl and ethyl;

in the formula (2), R' is selected from H, methyl and ethyl;

$R'_2$ and $R'_3$ are the same or different and are each independently selected from H, alkyl and aryl; for example, R'2 and R'3 are the same and are both selected from H;

X is selected from 0 and NR";

R" is selected from H and alkyl.

In a specific embodiment, the monofunctional thermoplastic photosensitive resin monomer may be selected from at least one of monofunctional thermoplastic acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, lauryl methacrylate, acryloyl morpholine, methacryloyl morpholine, cyclohexyl acrylate, cyclohexyl methacrylate, cyclic trimethylolpropane methylal acrylate, ethoxylated tetrahydrofuran acrylate, 5-norbornene-2-methanol acrylate, isobornyl acrylate, ethoxyethyl acrylate and 1,3-propanediol monoacrylate; for example, the monofunctional thermoplastic photosensitive resin monomer is at least one of acryloyl morpholine, methacryloyl morpholine, cyclic trimethylolpropane methylal acrylate, ethoxylated tetrahydrofuran acrylate, 5-norbornene-2-methanol acrylate and isobornyl acrylate; exemplarily, the monofunctional thermoplastic photosensitive resin monomer is at least one of acryloyl morpholine, ethoxylated tetrahydrofuran acrylate and isobornyl acrylate.

According to the present invention, the photoinitiator is selected from at least one of dibenzoyl, diphenylethanedione, dialkoxyacetophenone, camphorquinone, α-hydroxyalkyl phenyl ketones, α-aminoalkyl phenyl ketones, acylphosphine oxides, benzophenone, 4-methylbenzophenone, 2,4,6-trimethylbenzophenone, triethanolamine, N-methylethanolamine, N,N-dimethylethanolamine, N,N-diethylethanolamine, quinone compounds, titanocene compounds, iodonium salt compounds, sulfonium salt compounds, and triazine compounds; preferably, the photoinitiator is selected from at least one of camphorquinone, 2,4,6-trimethylbenzophenone, 4-methylbenzophenone and N-methylethanolamine; exemplarily, the photoinitiator is camphorquinone and/or 2,4,6-trimethylbenzophenone.

According to the present invention, the filler is selected from at least one of silica, ferroferric oxide, titanium dioxide, montmorillonite, boron nitride, graphene, molybdenum disulfide, graphene oxide, carbon nanotube, fiber, Mxene and liquid metal; for example, the filler is selected from at least one of silica, carbon nanotube, montmorillonite, graphene, titanium dioxide, and boron nitride nanoparticle; exemplarily, the functional filler is selected from silica nanoparticle, graphene, and/or liquid metal.

According to the present invention, the mass ratio of the photoinitiator to the photosensitive resin monomer is (0.01-5):100, preferably (0.1-3):100, and more preferably (0.5-2):100; for example, the mass ratio is 0.5:100, 1:100 or 1.5:100.

According to the present invention, the mass ratio of the filler to the photosensitive resin monomer is (0.01-20):100, preferably (0.1-10):100, and more preferably (0.5-5):100; for example, the mass ratio is 0.1:100, 1:100, 2:100 or 5:100.

[Use of the Composition]

The present invention provides use of the composition described above in preparation of a photocuring 3D printed linear polymer article.

[Photocuring 3D Printed Linear Polymer Article]

The present invention provides a photocuring 3D printed linear polymer article prepared from raw materials comprising the composition described above.

The 3D printed linear polymer article can be recovered and cyclically printed.

Further, after recovering and cyclic printing, the 3D printed linear polymer article may have similar or identical properties and/or identical or different structure compared with those before recovering.

[Preparation Method of Photocuring 3D Printed Linear Polymer Article]

The present invention provides a preparation method of the photocuring 3D printed linear polymer article described above, which comprises 1b) blending at least one photosensitive resin monomer with a photoinitiator to obtain a resin solution;

2b) optionally, adding a filler to the solution to obtain a mixed dispersion; and 3b) subjecting the resin solution obtained in the step 1b) or the mixed dispersion obtained in the step 2b) to photocuring 3D printing to obtain the photocuring 3D printed linear polymer article.

The photosensitive resin monomer, the photoinitiator and the filler, as well as the mass ratios thereof, are defined as above.

According to the preparation method of the present invention, the preparation of the resin solution of the step (1b) and/or the mixed dispersion of the step (2b) is performed under stirring. Further, the step (1b) and/or the step (2b) are performed at low temperature. The low temperature refers to a temperature in the range of 15-60° C., such as 20-60° C., and exemplarily room temperature (e.g., 15-40° C., preferably 20-35° C.) or 60° C.

According to the preparation method of the present invention, the photocuring 3D printing is performed by using equipment known in the art. For example, Creality 3D, ZRapid SLA500, Xiaofang ONE and other 3D printers can be used.

According to the preparation method of the present invention, in the step (3b), the laser used in the photocuring 3D printing process is visible light or ultraviolet light. The wavelength range of the visible light is 415-780 nm, such as 430-600 nm, and exemplarily 445 nm. The wavelength range of the ultraviolet light is 265-420 nm, such as 300-400 nm.

According to the preparation method of the present invention, in the step (3b), in the photocuring 3D printing process, the curing time per printing layer is 1-900 s, such as 10-400 s, or further 20-100 s, and exemplarily 10 s, 20 s, 30 s or 60 s.

According to the preparation method of the present invention, in the step (3b), in the photocuring 3D printing process, each printing layer has a layer thickness of 5-100 μm, such as 10-100 μm, and exemplarily 50 μm or 100 μm.

[Recovering Method of Photocuring 3D Printed Linear Polymer Article]

The present invention provides a recovering method of the photocuring 3D printed linear polymer article described above, which comprises adding the 3D printed linear polymer article into a photosensitive resin monomer and dissolving the 3D printed linear polymer article by stirring at a certain temperature to form a solution containing the resin monomer, wherein the photosensitive resin monomer is the same as that used for preparing the 3D printed linear polymer article;

the solution containing the resin monomer also contains the resin monomer dissolved from the printed article and the resin monomer added when dissolving the printed article.

According to the present invention, the mass ratio of the 3D printed linear polymer article to the photosensitive resin monomer is (0.1-50):(50-99.9), such as (1-30):(70-90), and exemplarily 3:97, 5:95 or 10:90.

According to the present invention, the certain temperature is 20-200° C., such as 30-160° C. or further 50-130° C., and exemplarily 80° C. or 120° C. The stirring time is 20 min to 5 h, such as 0.5-3 h, and exemplarily 1 h.

According to the present invention, the whole 3D printed linear polymer article can be directly added into the photosensitive resin monomer, or the 3D printed linear polymer article is firstly crushed and then added into the photosensitive resin monomer.

According to the present invention, the 3D printed linear polymer article is prepared by the preparation method of the photocuring 3D printed linear polymer article described above.

[Cyclic Printing Method of Photocuring 3D Printed Linear Polymer Article]

The present invention provides a cyclic printing method of the photocuring 3D printed linear polymer article, which comprises a) adding a 3D printed linear polymer article into a photosensitive resin monomer and dissolving the 3D printed linear polymer article by stirring at a certain temperature to form a solution containing the resin monomer, wherein the photosensitive resin monomer is the same as that used for preparing the 3D printed linear article;

b) blending the solution containing the resin monomer described above with a photoinitiator to obtain a resin solution;

c) optionally, adding a filler to the resin solution to obtain a mixed dispersion; and d) subjecting the solution obtained in the step b) or the mixed dispersion obtained in the step c) to photocuring 3D printing to obtain the photocuring 3D printed linear polymer article again.

According to the present invention, the photosensitive resin monomer, the filler and the photoinitiator are defined as above.

According to the present invention, the mass ratio of the photosensitive resin monomer and the 3D printed linear polymer article is defined as above.

According to the present invention, the whole 3D printed linear polymer article can be directly added into the photosensitive resin monomer, or the 3D printed linear polymer article is firstly crushed and then added into the photosensitive resin monomer.

According to the present invention, the mass ratio of the photoinitiator to the solution containing the resin monomer is (0.01-5):100, preferably (0.1-3):100, more preferably (0.5-2):100, and exemplarily 0.3:100, 0.5:100, or 1:100.

According to the present invention, the stirring at a certain temperature in the step a) and the photocuring 3D printing in the step d) are defined as in the step 1b) and the step 3b) of the preparation method of the photocuring 3D printed linear polymer article.

According to the present invention, the 3D printed linear polymer article in the step a) is prepared by the preparation method of the photocuring 3D printed linear polymer article described above.

[Recovering Method of Filler in Photocuring 3D Printed Linear Polymer Article]

The present invention provides a recovering method of filler in a photocuring 3D printed linear polymer article, which comprises A1) adding a 3D printed linear polymer article into a photosensitive resin monomer and dissolving the 3D printed linear polymer article by stirring at a certain temperature to form a solution containing the resin monomer, wherein the photosensitive resin monomer is the same as that used for preparing the 3D printed linear polymer article;

A2) centrifuging the solution containing the resin monomer obtained in the step A1) to enable the filler to be agglomerated at the bottom, and taking out the filler, and washing and drying.

According to the present invention, the mass ratio of the photosensitive resin monomer and the 3D printed linear polymer article is defined as above.

According to the present invention, the time of the centrifugation is 3 min to 2 h, such as 5 min to 1 h, and exemplarily 10 min or 20 min. Further, the centrifugation is performed at a rate of 50-12000 rpm, such as 5000-10000 rpm, and exemplarily 8000 rpm.

According to the present invention, the whole 3D printed linear polymer article can be directly added into the photosensitive resin monomer, or the 3D printed linear polymer article is firstly crushed and then added into the photosensitive resin monomer.

According to the present invention, the 3D printed linear polymer article in the step A1) is prepared by the preparation method of the photocuring 3D printed linear polymer article described above.

The technical solution of the present invention will be further illustrated in detail with reference to the following specific examples. It should be understood that the following examples are merely exemplary illustration and explanation of the present invention, and should not be construed as limiting the protection scope of the present invention. All techniques implemented based on the aforementioned contents of the present invention are encompassed within the protection scope of the present invention.

Unless otherwise specified, the raw materials and reagents used in the following examples are all commercially available products or can be prepared by known methods.

In the following examples and comparative examples, mechanical properties of the printed articles are tested according to test methods for properties of resin casting body: GB/T2567-2008.

Example A1

1) Hydroxyethyl acrylate (100 g) and camphorquinone (0.5 g) were blended, and the mixture was magnetically stirred for 30 min at room temperature at a rate of 600 rpm to obtain a hydroxyethyl acrylate resin solution;

2) At the rate of 600 rpm, zinc chloride (0.5 g) and silica nanoparticle (0.1 g) were added into the photosensitive resin solution obtained in the step 1), and the resulting mixture was stirred for 1 h to obtain a silica/hydroxyethyl acrylate photosensitive resin composite dispersion;

3) The resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 10 s.

The printed article obtained in the step 3) was damaged, and then its fracture surfaces were tightly bonded together, and the printed article was placed in an 80° C. oven for 1 h of heat preservation to obtain a healed article.

Figure 2:
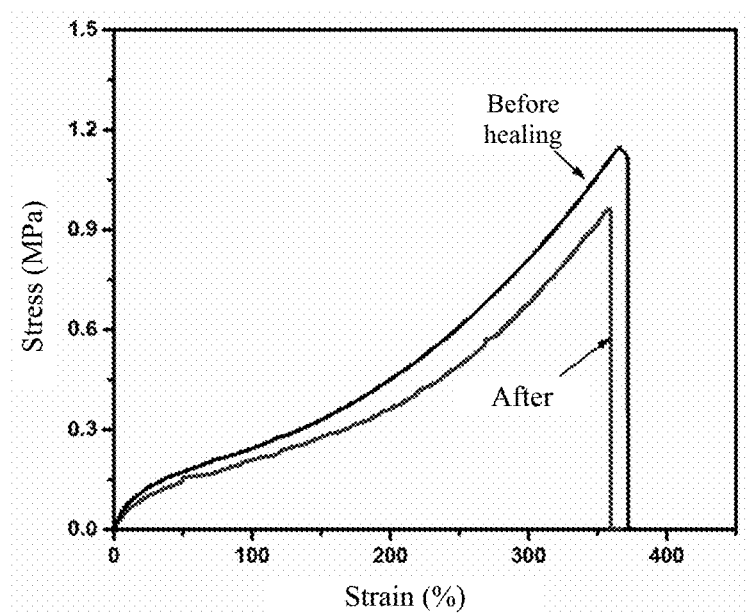
FIG. 2 shows stress-strain curves of the sample prepared in Example A1 before and after healing.

FIG. 1 shows photographs of a sample before and after healing. After heat treatment, the fractures of the sample were connected together again and the sample was stretched to a length 3 times the initial length without fracturing. The specific mechanical property curve is shown in FIG. 2.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 7 MPa, thus obtaining the recovered article.

Figure 3:
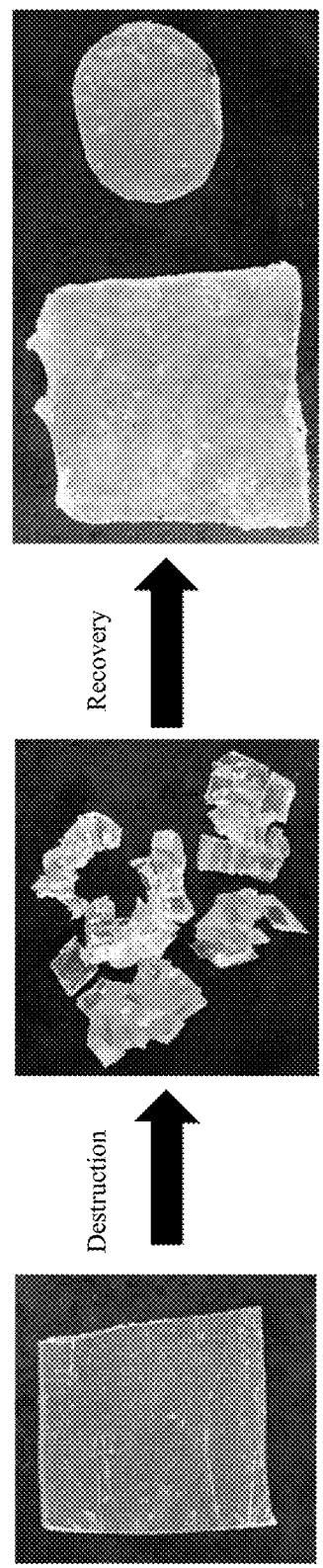
FIG. 3 shows photographs of the sample prepared in Example A1 before and after recovery.

FIG. 3 shows photographs of a sample before and after recovery. By cutting the original sample into small pieces and performing hot-pressing treatment, a complete recovered sample having the same appearance as the original sample was obtained.

Example A2

1) Hydroxyethyl acrylate (100 g) and 2,4,6-trimethylbenzophenone (0.5 g) were blended, and the mixture was magnetically stirred for 30 min at room temperature at a rate of 600 rpm to obtain a hydroxyethyl acrylate photosensitive resin solution;

2) At the rate of 600 rpm, copper chloride (0.5 g) and silica nanoparticle (1 g) were added into the photosensitive resin solution obtained in the step 1), and the resulting mixture was stirred for 1 h to obtain a silica/hydroxyethyl acrylate photosensitive resin composite dispersion;

3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 60 s.

Figure 4:
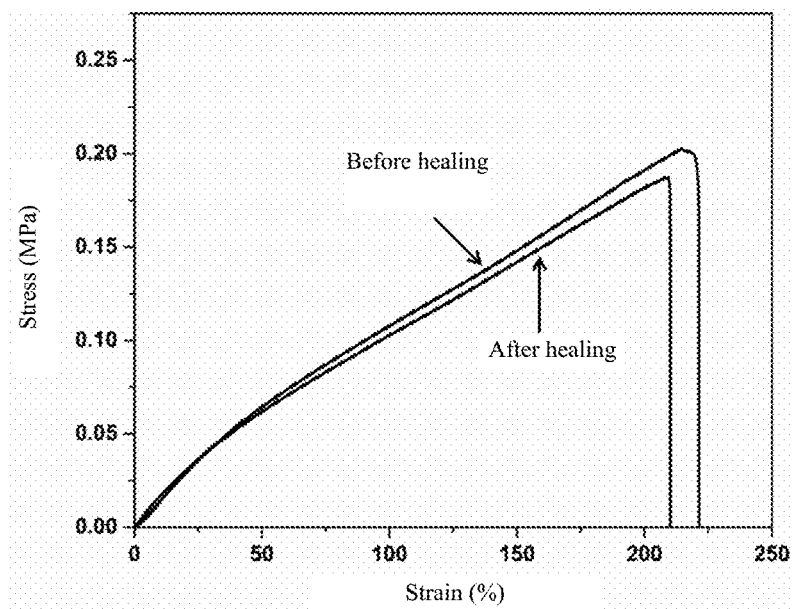
FIG. 4 shows stress-strain curves of the sample prepared in Example A2 before and after healing.

The printed article obtained in the step 3) was damaged, and then its fracture surfaces were tightly bonded together, and the printed article was placed in a 120° C. oven for 6 h of heat preservation to obtain a healed article. According to the test, the healed article was stretched to a length more than 2 times the initial length without fracturing. The specific mechanical property curve is shown in FIG. 4.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 7 MPa, thus obtaining the recovered article.

Example A3

1) Hydroxyethyl acrylate (100 g) and 2,4,6-trimethylbenzophenone (0.5 g) were blended, and the mixture was magnetically stirred for 30 min at room temperature at a rate of 600 rpm to obtain a hydroxyethyl acrylate photosensitive resin solution;

2) At the rate of 600 rpm, zinc methacrylate (0.5 g) and carbon nanotube (1 g) were added into the photosensitive resin solution obtained in the step 1), and the resulting mixture was stirred for 1 h to obtain a silica/hydroxyethyl acrylate photosensitive resin composite dispersion;

3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 7 MPa, thus obtaining the recovered article.

Example A4

1) Hydroxyethyl acrylate (100 g) and 2,4,6-trimethylbenzophenone (1 g) were blended, and the mixture was magnetically stirred for 30 min at room temperature at a rate of 600 rpm to obtain a hydroxyethyl acrylate photosensitive resin solution;
2) At the rate of 600 rpm, magnesium chloride (0.5 g) and montmorillonite (2 g) were added into the photosensitive resin solution obtained in the step 1), and the resulting mixture was stirred for 1 h to obtain a silica/hydroxyethyl acrylate photosensitive resin composite dispersion;
3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 7 MPa, thus obtaining the recovered article.

Example A5

1) Hydroxyethyl methacrylate (100 g) and 2,4,6-trimethylbenzophenone (1 g) were blended, and the mixture was magnetically stirred for 30 min at room temperature at a rate of 600 rpm to obtain a hydroxyethyl methacrylate photosensitive resin solution;
2) At the rate of 600 rpm, chromium chloride (0.5 g) and graphene oxide (2 g) were added into the photosensitive resin solution obtained in the step 1), and the resulting mixture was stirred for 1 h to obtain a silica/hydroxyethyl methacrylate photosensitive resin composite dispersion;
3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 8 MPa, thus obtaining the recovered article.

Example A6

1) Hydroxyethyl methacrylate (100 g) and 2,4,6-trimethylbenzophenone (0.5 g) were blended, and the mixture was magnetically stirred for 30 min at room temperature at a rate of 600 rpm to obtain a hydroxyethyl methacrylate photosensitive resin solution;
2) At the rate of 600 rpm, ferric chloride (0.5 g) and titanium dioxide (1 g) were added into the photosensitive resin solution obtained in the step 1), and the resulting mixture was stirred for 1 h to obtain a silica/hydroxyethyl methacrylate photosensitive resin composite dispersion;
3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 8 MPa, thus obtaining the recovered article.

Example A7

1) Hydroxyethyl methacrylate (100 g) and 2,4,6-trimethylbenzophenone (0.5 g) were blended, and the mixture was magnetically stirred for 30 min at room temperature at a rate of 600 rpm to obtain a hydroxyethyl methacrylate photosensitive resin solution;
2) At the rate of 600 rpm, magnesium nitrate (0.5 g) and boron nitride (1 g) were added into the photosensitive resin solution obtained in the step 1), and the resulting mixture was stirred for 1 h to obtain a silica/hydroxyethyl methacrylate photosensitive resin composite dispersion;
3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 8 MPa, thus obtaining the recovered article.

Example A8

1) Hydroxyethyl methacrylate (100 g) and 2,4,6-trimethylbenzophenone (0.5 g) were blended, and the mixture was magnetically stirred for 30 min at room temperature at a rate of 600 rpm to obtain a hydroxyethyl methacrylate photosensitive resin solution;

2) At the rate of 600 rpm, 2,2-dithiodiethanol diacrylate (5 g) was added into the photosensitive resin solution obtained in the step 1) (disulfide bonds were introduced), and the resulting mixture was stirred for 1 h to obtain a photosensitive resin composite dispersion;

3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 8 MPa, thus obtaining the recovered article.

Example A9

1) Monofunctional polyurethane acrylate (100 g) and 2,4,6-trimethylbenzophenone (0.5 g) were blended, and the mixture was magnetically stirred for 30 min at room temperature at a rate of 600 rpm to obtain a monofunctional polyurethane acrylate photosensitive resin solution;

2) At the rate of 600 rpm, 2,2-dithiodiethanol diacrylate (6 g) was added into the photosensitive resin solution obtained in the step 1) (disulfide bonds were introduced), and the resulting mixture was stirred for 1 h to obtain a photosensitive resin composite dispersion;

3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 8 MPa, thus obtaining the recovered article.

Example A10

1) Isobornyl acrylate (100 g) and 2,4,6-trimethylbenzophenone (0.5 g) were blended, and the mixture was magnetically stirred for 30 min at room temperature at a rate of 600 rpm to obtain an isobornyl acrylate photosensitive resin solution;

2) At the rate of 600 rpm, 2,2-dithiodiethanol diacrylate (5 g) was added into the photosensitive resin solution obtained in the step 1) (disulfide bonds were introduced), and the resulting mixture was stirred for 1 h to obtain a photosensitive resin composite dispersion;

3) The photosensitive resin composite dispersion obtained in the step 2) was subjected to photocuring 3D printing to obtain a photocuring 3D printed article, wherein the laser wavelength was 445 nm, the thickness of each layer was controlled to be 50 μm, and the curing time of each layer was controlled to be 20 s.

The printed article obtained in the step 3) was damaged, and then its fracture surfaces were tightly bonded together, and the printed article was placed in a 120° C. oven for 6 h of heat preservation to obtain a healed article. According to the test, the tensile strength of the healed article can be restored to 90% or more of the original strength.

The printed article obtained in the step 3) was completely damaged and was difficult to heal, and then the damaged article was cut into pieces by a scissor, added into a grinding tool, and then placed into a 120° C. hot press for 2 h of hot pressing under the pressure of 8 MPa, thus obtaining the recovered article.

Example B1

1) Acryloyl morpholine (100 g) and camphorquinone (0.5 g) were blended, and the mixture was magnetically stirred for 30 min at room temperature at a rate of 600 rpm to obtain an acryloyl morpholine resin solution;

2) The resin solution obtained in the step 1) was subjected to photocuring 3D printing to obtain a photocuring 3D printed linear polymer article, wherein the laser wavelength was 445 nm, the thickness of each layer was controlled to be 100 μm, and the curing time of each layer was controlled to be 10 s;

3) The printed article (5 g) obtained in the step 2) was crashed and then added into acryloyl morpholine monomer (95 g), and the mixture was stirred at 80° C. for 1 h to obtain a recovered solution, wherein the recovered solution contained both the acryloyl morpholine dissolved out from the crushed printed article and the acryloyl morpholine added when dissolving the printed article;

4) Camphorquinone (0.4 g) was added into the solution obtained in the step 3), and the mixture was magnetically stirred for 30 min at room temperature at a rate of 600 rpm to obtain a resin solution;

5) The resin solution obtained in the step 4) was subjected to photocuring 3D printing to obtain a photocuring 3D printed linear polymer article, wherein the laser wavelength was 445 nm, the thickness of each layer was controlled to be 100 μm, and the curing time of each layer was controlled to be 10 s.

Figure 5:
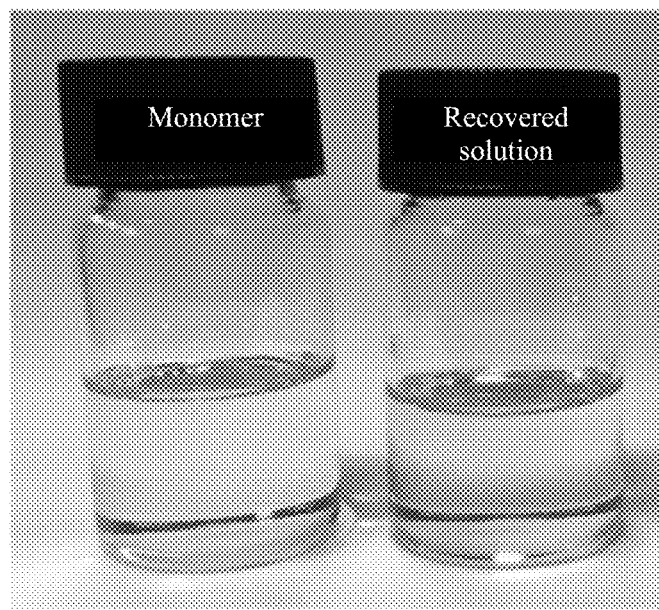
FIG. 5 shows photographs of the original resin monomer solution and the recovered solution in Example B1.

FIG. 5 shows photographs of the acryloyl morpholine resin monomer solution and the recovered solution obtained in the step 3), and it can be seen that in the recovered solution, the 3D printed linear polymer article is completely dissolved.

Figure 6:
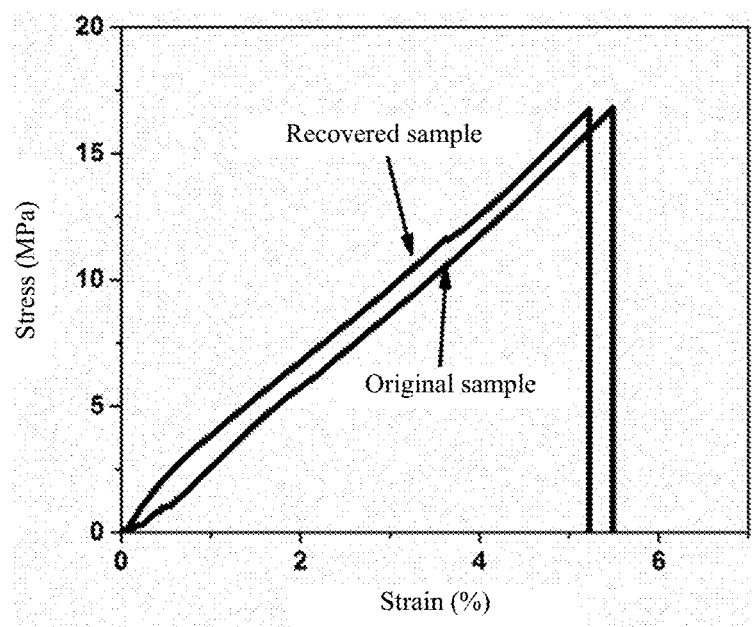
FIG. 6 shows stress-strain curves of the original article prepared in Example B1 and the photocuring 3D printed article obtained after the third recovery.

FIG. 6 shows stress-strain curves of the original printed article and the printed article obtained after the third recovery, and it can be seen that the mechanical properties of the 3D printed linear polymer article obtained before and after recovery are similar, and the requirements of photocuring printing can be met in both cases.

Figure 7:
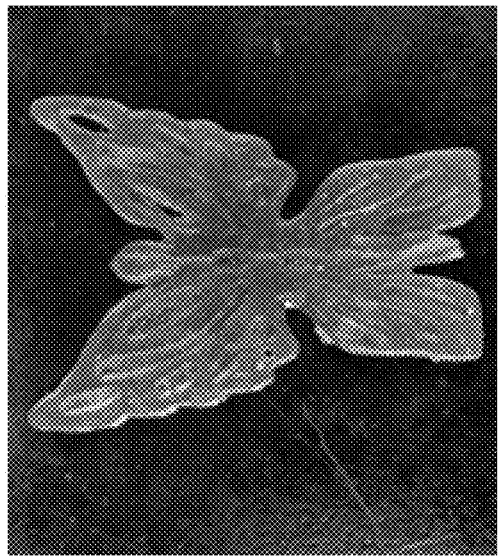
FIG. 7 shows photographs of the original article prepared in Example B1 and the photocuring 3D printed article obtained after the third recovery.
Figure 7:
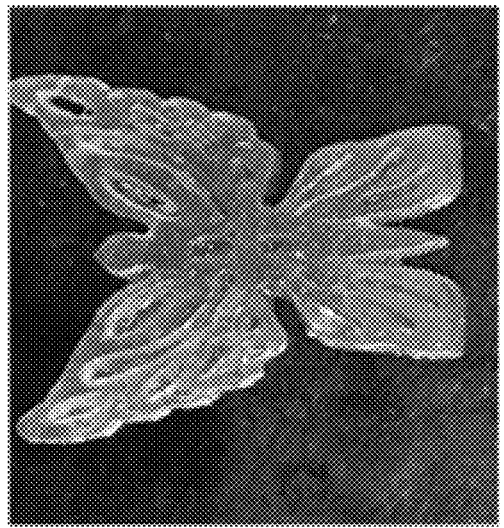

FIG. 7 shows photographs of the original printed article and the printed article obtained after the third recovery, and it can be seen that the structure of the printed article obtained after recovery and cyclic printing is basically the same as that of the original printed article.

Example B2

1) Acryloyl morpholine (100 g), camphorquinone (0.5 g) and liquid metal (5 g) were blended, and the mixture was magnetically stirred at 60° C. for 30 min at a rate of 600 rpm to obtain an acryloyl morpholine resin composite solution;

2) The resin composite solution obtained in the step 1) was subjected to photocuring 3D printing to obtain a photocuring 3D printed linear polymer article, wherein the laser wavelength was 445 nm, the thickness of each layer was controlled to be 100 μm, and the curing time of each layer was controlled to be 10 s;

3) The printed article (5 g) obtained in the step 2) was crashed and then added into acryloyl morpholine monomer (95 g), and the mixture was stirred at 80° C. for 1 h to obtain a solution, wherein the recovered solution contained both the acryloyl morpholine dissolved out from the crushed printed article and the acryloyl morpholine added when dissolving the printed article;

4) The solution obtained in the step 3) was centrifuged in a centrifuge at a rate of 8000 rpm for 10 min, and the liquid metal was deposited at the bottom of the solution, then taken out, washed with ethanol repeatedly, and placed in a 60° C. oven for 3 h to obtain the recovered liquid metal.

Figure 8:
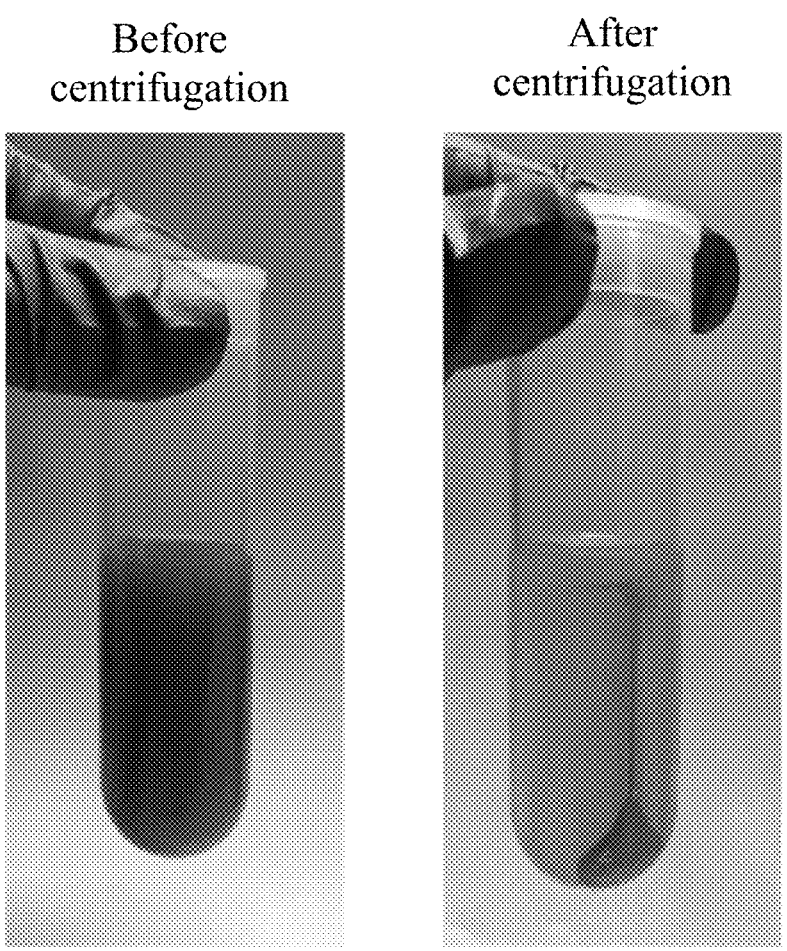
FIG. 8 shows photographs showing the dispersion of the filler before and after the resin solution is centrifuged in Example B2.
Figure 9:
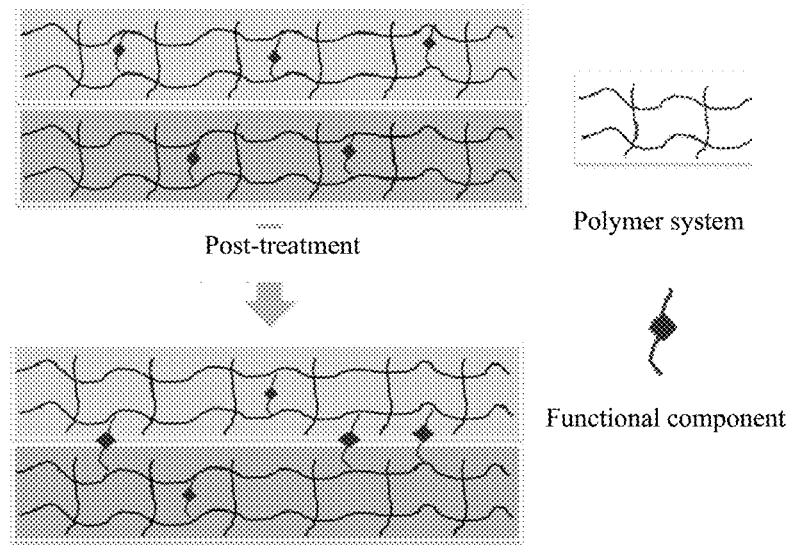
FIG. 9 shows a schematic diagram illustrating introducing interface interaction to enhance the inter-layer bonding force of a printed article.

FIG. 8 shows photographs of the recovered solution before and after centrifugation, and it can be seen that by centrifugation, the liquid metal is almost completely recovered.

Example B3

1) Acryloyl morpholine (100 g) and camphorquinone (0.5 g) were blended, and the mixture was magnetically stirred for 30 min at room temperature at a rate of 600 rpm to obtain an acryloyl morpholine resin solution;

2) The resin solution obtained in the step 1) was subjected to photocuring 3D printing to obtain a photocuring 3D printed linear polymer article, wherein the laser wavelength was 445 nm, the thickness of each layer was controlled to be 50 μm, and the curing time of each layer was controlled to be 10 s;

3) The printed article (3 g) obtained in the step 2) was crashed and then added into acryloyl morpholine monomer (97 g), and the mixture was stirred at 80° C. for 1 h to obtain a recovered solution, wherein the recovered solution contained both the acryloyl morpholine dissolved out from the crushed printed article and the acryloyl morpholine added when dissolving the printed article;

4) Camphorquinone (0.4 g) was added into the solution obtained in the step 3), and the mixture was magnetically stirred for 30 min at room temperature at a rate of 600 rpm to obtain a resin solution;

5) The resin solution obtained in the step 4) was subjected to photocuring 3D printing to obtain a photocuring 3D printed linear polymer article, wherein the laser wavelength was 445 nm, the thickness of each layer was controlled to be 50 μm, and the curing time of each layer was controlled to be 10 s.

The mechanical properties of the 3D printed linear polymer article obtained before and after recovery are similar, and the requirements of photocuring printing can be met in both cases.

Example B4

1) Acryloyl morpholine (100 g), camphorquinone (0.5 g) and graphene (1 g) were blended, and the mixture was magnetically stirred at 60° C. for 30 min at a rate of 600 rpm to obtain an acryloyl morpholine resin composite solution;

2) The resin composite solution obtained in the step 1) was subjected to photocuring 3D printing to obtain a photocuring 3D printed linear polymer article, wherein the laser wavelength was 445 nm, the thickness of each layer was controlled to be 100 μm, and the curing time of each layer was controlled to be 10 s;

3) The printed article (5 g) obtained in the step 2) was crashed and then added into acryloyl morpholine monomer (95 g), and the mixture was stirred at 80° C. for 1 h to obtain a recovered solution, wherein the recovered solution contained both the acryloyl morpholine dissolved out from the crushed printed article and the acryloyl morpholine added when dissolving the printed article;

4) The solution obtained in the step 3) was centrifuged in a centrifuge at a rate of 8000 rpm for 10 min, and the graphene was deposited at the bottom of the solution, then taken out, washed with ethanol repeatedly, and placed in a 60° C. oven for 3 h to obtain the recovered graphene.

Example B5

1) Ethoxylated tetrahydrofuran acrylate (100 g) and camphorquinone (0.5 g) were blended, and the mixture was magnetically stirred for 30 min at room temperature at a rate of 600 rpm to obtain an ethoxylated tetrahydrofuran acrylate resin solution;

2) The resin solution obtained in the step 1) was subjected to photocuring 3D printing to obtain a photocuring 3D printed linear polymer article, wherein the laser wavelength was 445 nm, the thickness of each layer was controlled to be 50 μm, and the curing time of each layer was controlled to be 30 s;

3) The printed article (10 g) obtained in the step 2) was crashed and then added into ethoxylated tetrahydrofuran acrylate monomer (90 g), and the mixture was stirred at 80° C. for 1 h to obtain a recovered solution, wherein the recovered solution contained both the ethoxylated tetrahydrofuran acrylate dissolved out from the crushed printed article and the ethoxylated tetrahydrofuran acrylate added when dissolving the printed article;

4) Camphorquinone (0.3 g) was added into the solution obtained in the step 3), and the mixture was magnetically stirred for 30 min at room temperature at a rate of 600 rpm to obtain a resin solution;

5) The resin solution obtained in the step 4) was subjected to photocuring 3D printing to obtain a photocuring 3D printed linear polymer article, wherein the laser wavelength was 445 nm, the thickness of each layer was controlled to be 50 μm, and the curing time of each layer was controlled to be 30 s.

The mechanical properties of the 3D printed linear polymer article obtained before and after recovery are similar, and the requirements of photocuring printing can be met in both cases.

Example B6

1) Ethoxylated tetrahydrofuran acrylate (100 g), camphorquinone (0.5 g) and silica (1 g) were blended, and the mixture was magnetically stirred at 60° C. for 30 min at a rate of 600 rpm to obtain an ethoxylated tetrahydrofuran acrylate resin composite solution;
2) The resin composite solution obtained in the step 1) was subjected to photocuring 3D printing to obtain a photocuring 3D printed linear polymer article, wherein the laser wavelength was 445 nm, the thickness of each layer was controlled to be 100 μm, and the curing time of each layer was controlled to be 30 s;
3) The printed article (5 g) obtained in the step 2) was crashed and then added into ethoxylated tetrahydrofuran acrylate monomer (95 g), and the mixture was stirred at 80° C. for 1 h to obtain a recovered solution, wherein the recovered solution contained both the ethoxylated tetrahydrofuran acrylate dissolved out from the crushed printed article and the ethoxylated tetrahydrofuran acrylate added when dissolving the printed article;
4) The solution obtained in the step 3) was centrifuged in a centrifuge at a rate of 8000 rpm for 10 min, and the silica was deposited at the bottom of the solution, then taken out, washed with ethanol repeatedly, and placed in a 60° C. oven for 3 h to obtain the recovered silica.

A 3D linear polymer article that is capable of being recovered and cyclically printed can still be prepared when the photosensitive resin monomer in the examples is replaced with other substances listed in the specification and the photoinitiator is replaced with other substances listed in the specification. The mechanical properties of the 3D printed linear polymer article obtained before and after recovery are similar, and the requirements of photocuring printing can be met in both cases.

Example C1

The method for enhancing the performance of the digital light processing 3D printed article was performed as follows:
1) 100 g of hydroxyethyl acrylate as a photosensitive resin monomer, 5 g of hexanediol diacrylate as a cross-linking agent, 0.5 g of camphorquinone as a photoinitiator and 0.1 g of hydroquinone as a polymerization inhibitor were thoroughly mixed, and the mixture was magnetically stirred for 20 min at room temperature at a rate of 500 rpm to obtain a photosensitive resin solution;
2) At the rate of 500 rpm, 1 g of zinc chloride as a functional component and 0.5 g of graphene as a nanoparticle were added into the photosensitive resin solution obtained in the step 1), and the mixture was stirred for 1 h to obtain a photosensitive resin composite dispersion; and
3) The resin composite dispersion obtained in the step 2) was subjected to digital light processing 3D printing to obtain a 3D printed article, wherein the laser wavelength was 445 nm, the thickness of each layer was controlled to be 80 μm, and the curing time of each layer was controlled to be 10 s.

The printed article obtained in the step 3) was placed in a 100° C. oven for 6 h of heat treatment to obtain an enhanced printed article.

Figure 10:
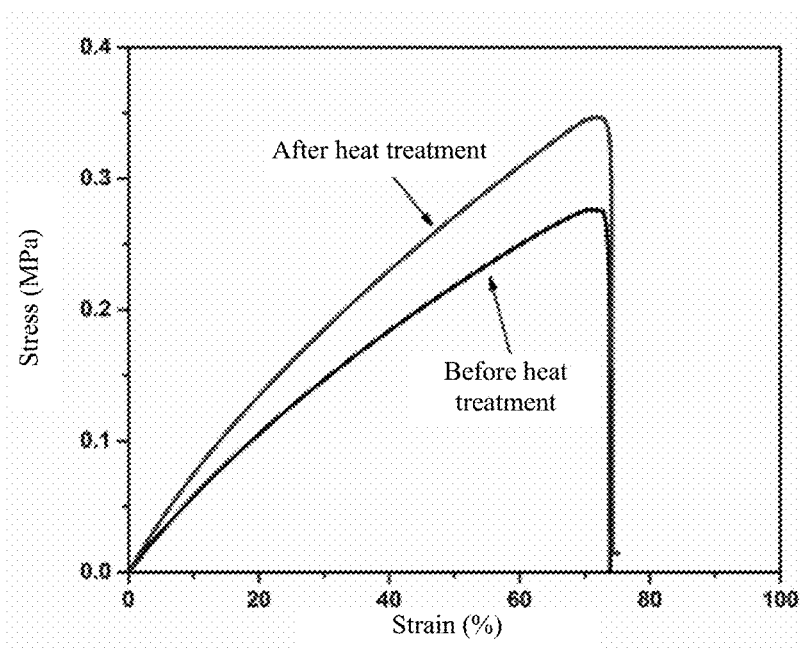
FIG. 10 shows stress-strain curves of the digital light processing 3D printed sample of Example C1 before and after treatment.

FIG. 10 shows stress-strain curves of the digital light processing 3D printed article of this example before and after treatment. Compared with the printed article before treatment, the printed article after treatment shows significant improvement (by about 50%) in tensile strength, and the elongation at break keeps unchanged.

Example C2

The method for enhancing the performance of the digital light processing 3D printed article was performed as follows:
1) 100 g of hydroxyethyl acrylate as a photosensitive resin monomer, 5 g of hexanediol diacrylate as a cross-linking agent, 0.5 g of camphorquinone as a photoinitiator and 0.1 g of hydroquinone as a polymerization inhibitor were thoroughly mixed, and the mixture was magnetically stirred for 20 min at room temperature at a rate of 500 rpm to obtain a photosensitive resin solution;
2) At the rate of 500 rpm, 1 g of zinc acrylate as a functional component and 0.5 g of graphene as a nanoparticle were added into the photosensitive resin solution obtained in the step 1), and the mixture was stirred for 1 h to obtain a photosensitive resin composite dispersion; and
3) The resin composite dispersion obtained in the step 2) was subjected to digital light processing 3D printing to obtain a 3D printed article, wherein the laser wavelength was 445 nm, the thickness of each layer was controlled to be 80 μm, and the curing time of each layer was controlled to be 10 s.

The printed article obtained in the step 3) was placed in a 100° C. oven for 6 h of heat treatment to obtain an enhanced printed article.

Example C3

The method for enhancing the performance of a direct ink writing 3D printed article was performed as follows:
1) 10 g of polyvinyl alcohol as a polymer powder material was dissolved in 100 mL of deionized water as a solvent, wherein the stirring rate was 500 rpm, and the dissolving temperature was controlled to be 60° C.;
2) At the rate of 500 rpm, 1 g of zinc chloride as a functional component and 0.5 g of nanosilica as a nanoparticle were added into the solution obtained in the step 1), and the mixture was stirred for 1 h to obtain a composite dispersion; and
3) The dispersion obtained in the step 2) was subjected to direct ink writing 3D printing to obtain a 3D printed article, wherein the diameter of the printing head was 70 μm and the printing speed was 10 mm/s.

The printed article obtained in the step 3) was placed in a 50° C. oven for 2 h of heat treatment to obtain an enhanced printed article.

Figure 11:
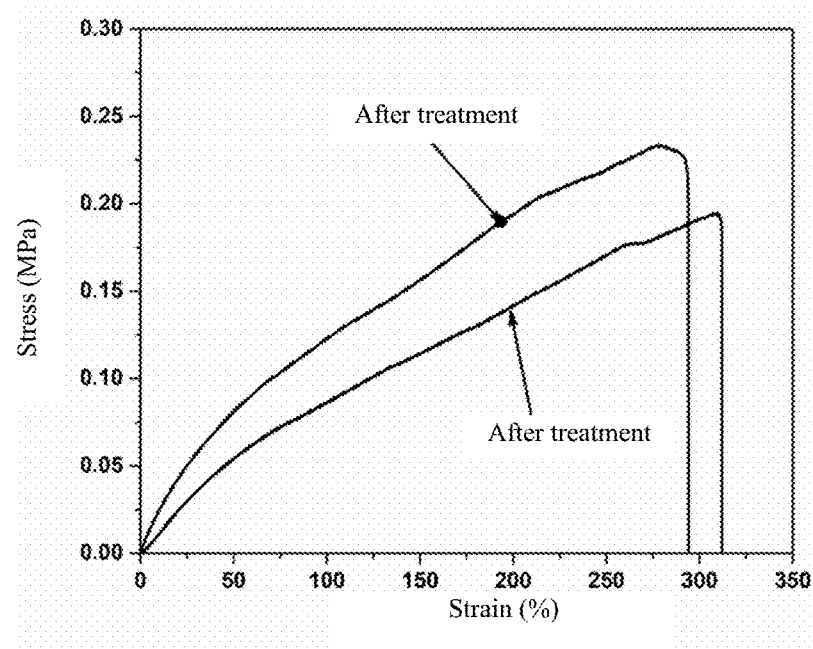
FIG. 11 shows stress-strain curves of the direct ink writing 3D printed sample of Example C3 before and after treatment.

FIG. 11 shows stress-strain curves of the direct ink writing 3D printed article of this example before and after treatment. Compared with the printed article before treatment, the printed article after treatment shows significant improvement (by about 30%) in tensile strength, and the elongation at break does not change greatly.

Example C4

The method for enhancing the performance of a fused deposition 3D printed article was performed as follows:
1) 100 g of polylactic acid as a polymer powder material, 1 g of zinc chloride as a functional component and 0.5 g of nanosilica as a nanoparticle were melting-blended, wherein the blending temperature was 180° C.; and 2) The polymer composite material obtained in the step 1) was subjected to fused deposition 3D printing to obtain a 3D printed article, wherein the diameter of the printing head was 100 μm and the printing speed was 10 mm/s.

The printed article obtained in the step 2) was placed in an 80° C. oven for 5 h of heat treatment to obtain an enhanced printed article.

Figure 12:
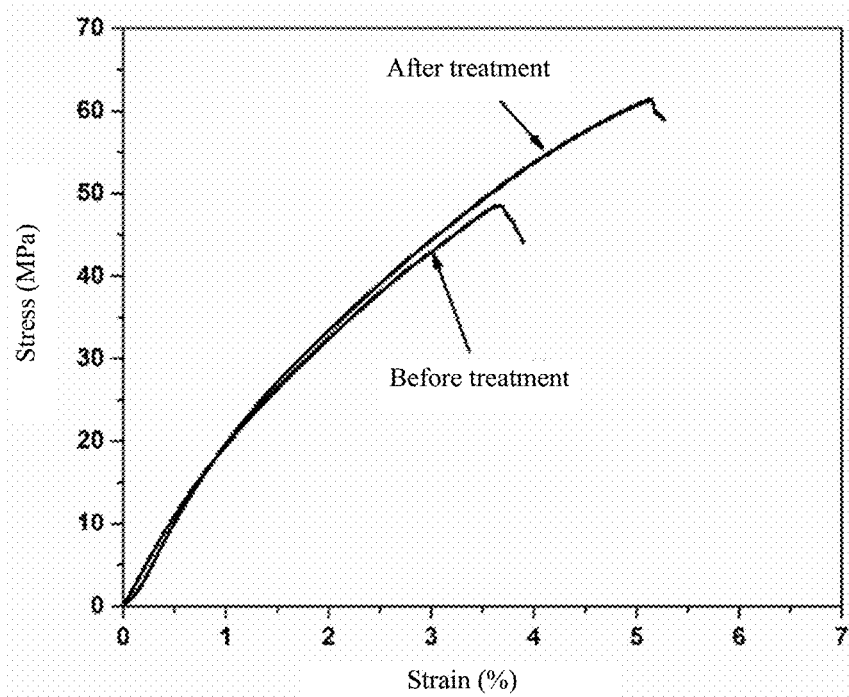
FIG. 12 shows stress-strain curves of the fused deposition 3D printed sample of Example C4 before and after treatment.

FIG. 12 shows stress-strain curves of the fused deposition 3D printed article of this example before and after treatment. Compared with the printed article before treatment, the printed article after treatment shows significant improvement (by about 10%) in tensile strength.

Example C5

The method for enhancing the performance of a fused deposition 3D printed article was performed as follows:

1) 100 g of polymethylmethacrylate as a polymer powder material, 1 g of zinc chloride as a functional component and 0.5 g of graphene as a nanoparticle were melting-blended, wherein the blending temperature was 180° C.; and 2) The polymer composite material obtained in the step 1) was subjected to fused deposition 3D printing to obtain a 3D printed article, wherein the diameter of the printing head was 100 μm and the printing speed was 10 mm/s.

The printed article obtained in the step 2) was placed in a 150° C. oven for 5 h of heat treatment to obtain an enhanced printed article.

Example C6

The method for enhancing the performance of a fused deposition 3D printed article was performed as follows:

1) 100 g of polymethylmethacrylate as a polymer powder material, 2 g of copper chloride as a functional component and 0.5 g of montmorillonite as a nanoparticle were melting-blended, wherein the blending temperature was 180° C.; and 2) The polymer composite material obtained in the step 1) was subjected to fused deposition 3D printing to obtain a 3D printed article, wherein the diameter of the printing head was 100 μm and the printing speed was 10 mm/s.

The printed article obtained in the step 2) was placed in a 150° C. oven for 6 h of heat treatment to obtain an enhanced printed article.

Comparative Example C1

The method for enhancing the performance of the digital light processing 3D printed article was performed as follows:

1) 100 g of hydroxyethyl acrylate as a photosensitive resin monomer, 5 g of hexanediol diacrylate as a cross-linking agent, 0.5 g of camphorquinone as a photoinitiator and 0.1 g of hydroquinone as a polymerization inhibitor were thoroughly mixed, and the mixture was magnetically stirred for 20 min at room temperature at a rate of 500 rpm to obtain a resin solution;

2) At the rate of 500 rpm, 0.5 g of graphene as a nanoparticle was added into the photosensitive resin solution obtained in the step 1), and the mixture was stirred for 1 h to obtain a photosensitive resin composite dispersion; and 3) The resin composite dispersion obtained in the step 2) was subjected to digital light processing 3D printing to obtain a 3D printed article, wherein the laser wavelength was 445 nm, the thickness of each layer was controlled to be 80 μm, and the curing time of each layer was controlled to be 10 s. The printed article obtained in the step 3) was placed in a 100° C. oven for 6 h of heat treatment to obtain a printed article after heat treatment.

Compared with the Example C1, the functional component zinc chloride is not added, and the other conditions are not changed.

Comparative Example C2

The method for enhancing the performance of the digital light processing 3D printed article was performed as follows:

1) 100 g of hydroxyethyl acrylate as a photosensitive resin monomer, 5 g of hexanediol diacrylate as a cross-linking agent, 0.5 g of camphorquinone as a photoinitiator and 0.1 g of hydroquinone as a polymerization inhibitor were thoroughly mixed, and the mixture was magnetically stirred for 20 min at room temperature at a rate of 500 rpm to obtain a resin solution;

2) At the rate of 500 rpm, 0.5 g of graphene as a nanoparticle was added into the photosensitive resin solution obtained in the step 1), and the mixture was stirred for 1 h to obtain a photosensitive resin composite dispersion; and 3) The resin composite dispersion obtained in the step 2) was subjected to digital light processing 3D printing to obtain a 3D printed article, wherein the laser wavelength was 445 nm, the thickness of each layer was controlled to be 80 μm, and the curing time of each layer was controlled to be 10 s.

The printed article obtained in the step 3) was placed in a 100° C. oven for 12 h of heat treatment to obtain a printed article after heat treatment.

Compared with the Comparative Example C1, the time of heat treatment is prolonged from 6 h to 12 h, and the other conditions are not changed.

Figure 13:
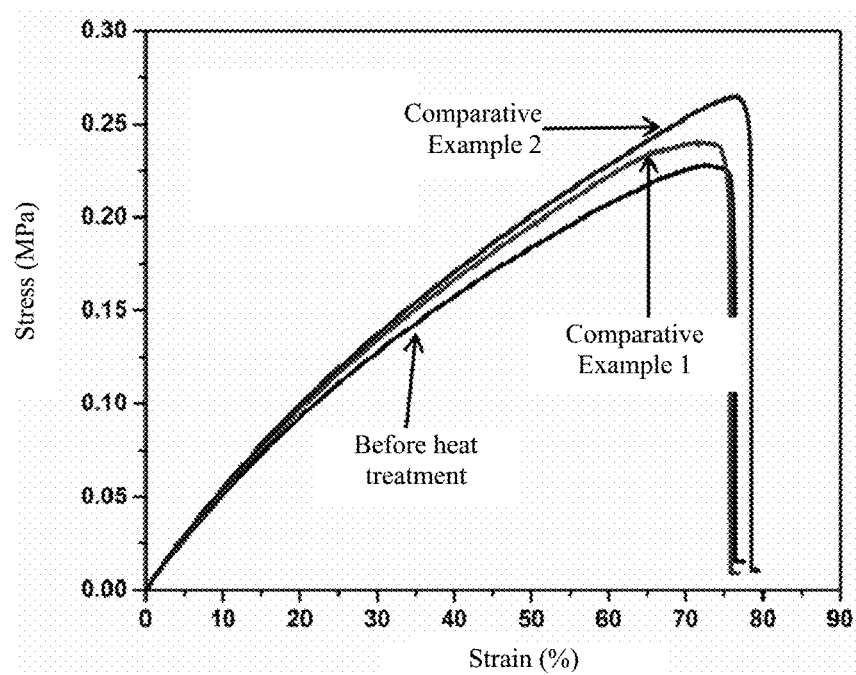
FIG. 13 shows stress-strain curves of the digital light processing 3D printed samples of Comparative Example C1 and Comparative Example C2 before and after treatment.

FIG. 13 shows stress-strain curves of the digital light processing 3D printed samples of Comparative Example C1 and Comparative Example C2 before and after treatment. In FIG. 5, the functional component zinc chloride is not added either in the Comparative Example C1 or the Comparative Example C2, and the mechanical properties of the printed article are not greatly changed before and after heat treatment; according to the comparison between the Comparative Example C1 and the Comparative Example C2, it can be seen that the mechanical properties can be slightly improved by prolonging the time of heat treatment. In contrast with these two comparative examples, the printed article of Example C1 (FIG. 2), in which the functional component is added, shows significant improvement in mechanical properties after a shorter period of heat treatment; its tensile strength is improved by about 50% and its elongation at break remains unchanged as compared to those before heat treatment.

The examples of the present invention have been described above. However, the present invention is not limited to the above examples. Any modification, equivalent, improvement and the like made within the spirit and principle of the present invention shall fall within the protection scope of the present invention.

The invention claimed is:

1. A 3D printed article, printed with a composition consists of a functional monomer, at least one monofunctional photosensitive resin monomer, a photoinitiator, and optionally a filler, wherein the functional monomer is selected from a compound of formula (I), a compound containing dynamic chemical bonds, and mixtures thereof,

  formula (I), in the formula (I), M is a metal ion, and R is an anion;
x=1 and y=n/m when n/m is an integer, and x=m and y=n when n/m is not an integer, n being the valence number of the metal ion, and m being the valence number of the anion, wherein the monofunctional photosensitive resin monomer is selected from a compound of formula (1), a compound of formula (2), and mixtures thereof;

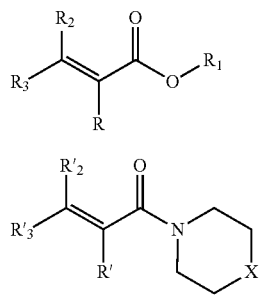

in the formula (1), $R_1$ is selected from H and one of the following substituted or unsubstituted groups: alkyl, cycloalkyl, a heterocyclic ring, a bridged ring and polyurethane group, the substituted group being selected from hydroxy, alkoxy and norbornenyl;
$R_2$ and $R_3$ are the same or different and are each independently selected from H, alkyl and aryl;
R is selected from H, methyl and ethyl;
in the formula (2), R' is selected from H, methyl and ethyl;
$R'_2$ and $R'_3$ are the same or different and are each independently selected from H, alkyl and aryl; and
X is selected from O and NR", wherein R" is selected from H and alkyl.

2. A preparation method for the 3D printed article according to claim 1, comprising:
   1a) blending the at least one monofunctional photosensitive resin monomer with the photoinitiator to obtain a solution;
   2a) adding the functional monomer, and optionally a nanoparticle as the filler, into the solution to obtain a mixed dispersion; and
   3a) subjecting the mixed dispersion obtained in step 2a) to photocuring 3D printing to obtain the 3D printed article.

3. The 3D printed article according to claim 1 that is a photocuring 3D printed linear polymer article.

4. A preparation method, for the photocuring 3D printed linear polymer article according to claim 3, comprising:
   1b) blending the at least one monofunctional photosensitive resin monomer with the photoinitiator to obtain a resin solution;
   2b) optionally, adding the filler to the resin solution to obtain a mixed dispersion; and
   3b) subjecting the resin solution of the step 1b) or the mixed dispersion obtained in the step 2b) to photocuring 3D printing to obtain the photocuring 3D printed linear polymer article.

5. A method for recovering a filler in a 3D printed article made of a composition comprising a monofunctional photosensitive resin monomer, a photoinitiator, and the filler, the recovering method comprising:
   A1) adding the 3D printed linear polymer article into the photosensitive resin monomer and dissolving the 3D printed linear polymer article by stirring at a certain temperature to form a solution; and
   A2) centrifuging the solution to aggregate at a bottom of the solution, and separating the filler from the solution, and washing and drying the filler.

6. A method for improving interface strength of a 3D printed article, comprising:
   (1c) introducing a functional monomer into a 3D printing material system comprising a polymer and performing 3D printing to obtain a printed article; and
   (2c) performing activation treatment on the printed article obtained in the step (1c) to improve the interface strength of the printed article,
   wherein the functional monomer is introduced into the 3D printing material system by blending with the polymer,
   wherein the polymer comprises at least one of oxygen, nitrogen, sulfur, boron, and phosphorus, and
   the functional monomer is defined according to claim 1.

7. The composition according to claim 1, wherein the monofunctional photosensitive resin monomer is selected from at least one of acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, isobornyl acrylate, lauryl methacrylate, cyclohexyl acrylate, cyclohexyl methacrylate, ethoxyethyl acrylate, and 1,3-propanediol monoacrylate; or
   the photoinitiator is selected from at least one of dibenzoyl, diphenylethanedione, dialkoxyacetophenone, camphorquinone, α-hydroxyalkyl phenyl ketones, α-aminoalkyl phenyl ketones, acylphosphine oxides, benzophenone, 4-methylbenzophenone, 2,4,6-trimethylbenzophenone, triethanolamine, N-methylethanolamine, N,N-dimethylethanolamine, N,N-diethylethanolamine, quinone compounds, titanocene compounds, iodonium salt compounds, sulfonium salt compounds, and triazine compounds; or
   the composition comprises a nanoparticle as the filler;
   the mass ratio of the functional monomer to the monofunctional photosensitive resin monomer is (0.05-5):100; or
   the mass ratio of the photoinitiator to the monofunctional photosensitive resin monomer is (0.01-5):100; or
   the mass ratio of the nanoparticle to the monofunctional photosensitive resin monomer is (0.01-20):100; or the composition is used for preparing a photocuring 3D printed article.

8. The composition according to claim 7, wherein the nanoparticle is at least one of silica, ferroferric oxide, titanium dioxide, montmorillonite, boron nitride, graphene, molybdenum disulfide, graphene oxide and carbon nanotube.

9. The 3D printed article according to claim 1, wherein the monofunctional photosensitive resin monomer is selected from at least one of acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, isobornyl acrylate, lauryl methacrylate, cyclohexyl acrylate, cyclohexyl methacrylate, ethoxyethyl acrylate, and 1,3-propanediol monoacrylate; or
   the photoinitiator is selected from at least one of dibenzoyl, diphenylethanedione, dialkoxyacetophenone, camphorquinone, α-hydroxyalkyl phenyl ketones, α-aminoalkyl phenyl ketones, acylphosphine oxides, benzophenone, 4-methylbenzophenone, 2,4,6-trimethylbenzophenone, triethanolamine, N-methylethanolamine, N,N-dimethylethanolamine, N,N-diethylethanolamine, quinone compounds, titanocene compounds, iodonium salt compounds, sulfonium salt compounds, and triazine compounds; or the composition comprises a nanoparticle as the filler; or the mass ratio of the functional monomer to the monofunctional photosensitive resin monomer is (0.05-5):100; or the mass ratio of the photoinitiator to the monofunctional photosensitive resin monomer is (0.01-5):100; or the mass ratio of the nanoparticle to the monofunctional photosensitive resin monomer is (0.01-20):100.

10. The 3D printed article according to claim 9, wherein the nanoparticle is at least one of silica, ferroferric oxide, titanium dioxide, montmorillonite, boron nitride, graphene, molybdenum disulfide, graphene oxide and carbon nanotube.

11. The 3D printed article according to claim 3, wherein, the monofunctional photosensitive resin monomer is selected from at least one of monofunctional thermoplastic acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, lauryl methacrylate, acryloyl morpholine, methacryloyl morpholine, cyclohexyl acrylate, cyclohexyl methacrylate, cyclic trimethylolpropane methylal acrylate, ethoxylated tetrahydrofuran acrylate, 5-norbornene-2-methanol acrylate, isobornyl acrylate, ethoxyethyl acrylate and 1,3-propanediol monoacrylate; or the photoinitiator is selected from at least one of dibenzoyl, diphenylethanedione, dialkoxyacetophenone, camphorquinone, α-hydroxyalkyl phenyl ketones, α-aminoalkyl phenyl ketones, acylphosphine oxides, benzophenone, 4-methylbenzophenone, 2,4,6-trimethylbenzophenone, triethanolamine, N-methylethanolamine, N,N-dimethylethanolamine, N,N-diethylethanolamine, quinone compounds, titanocene compounds, iodonium salt compounds, sulfonium salt compounds, and triazine compounds; or the filler is selected from at least one of silica, ferroferric oxide, titanium dioxide, montmorillonite, boron nitride, graphene, molybdenum disulfide, graphene oxide, carbon nanotube, fiber, Mxene and liquid metal; or the mass ratio of the photoinitiator to the monofunctional photosensitive resin monomer is (0.01-5):100; or the mass ratio of the filler to the monofunctional photosensitive resin monomer is (0.01-20):100; or the composition is used for preparing a photocuring 3D printed linear polymer article.

12. The method according to claim 6, wherein the 3D printing is at least one of fused deposition (FDM), selective heat sintering (SHS), selective laser sintering (SLS), stereolithography (SLA), laminated object manufacturing (LOM), digital light processing (DLP) and direct ink writing (DIW); or the activation treatment is at least one of heat treatment, light irradiation treatment and electric treatment; or the polymer is at least one of polymer powder, polymer wire, polymer film and liquid photosensitive resin; or the polymer in the polymer powder, the polymer wire and the polymer film is selected from at least one of polylactic acid, polyetheretherketone, polyurethane, polycarbonate, polymethylmethacrylate, polyvinyl alcohol, ethylene-vinyl acetate copolymer, acrylate copolymer, nylon, acrylonitrile-butadiene-styrene copolymer (ABS) and polyterephthalic acid plastic; or the liquid photosensitive resin is selected from at least one of polyepoxy acrylate, unsaturated polyester, polyurethane acrylate, polyester acrylate, polyether acrylate, polyacrylate and photocuring organosilicon oligomer; or the photosensitive resin is obtained by polymerization of raw materials including a monofunctional photosensitive resin monomer, and the monofunctional photosensitive resin monomer is selected from at least one of acrylic acid, methacrylic acid, methyl acrylate, methyl methacrylate, epoxy acrylate, hydroxyethyl acrylate, hydroxyethyl methacrylate, polyurethane acrylate, polyurethane methacrylate, lauryl acrylate, lauryl methacrylate, cyclohexyl acrylate, cyclohexyl methacrylate, ethoxyethyl acrylate, and 1,3-propanediol monoacrylate; or when the liquid photosensitive resin is selected, the raw materials further comprise a photoinitiator; or the raw materials further comprise a polymerization inhibitor; or the mass ratio of the functional monomer to the polymer is 1:(10-150); or the polymer material in the step (1) contains a nanoparticle; or the mass ratio of the nanoparticle to the polymer is 1:(10-250); or the material system further comprises other components suitable to be contained in the material system of corresponding 3D printing method.

13. The method according to claim 12, wherein the nanoparticle is selected from at least one of silica, ferroferric oxide, titanium dioxide, montmorillonite, boron nitride, graphene, molybdenum disulfide, graphene oxide and carbon nanotube; or the other components are at least one of liquid metal and pigment.

14. A self-healing method for a 3D printed article according to claim 1, wherein the 3D printed article is damaged and has fractured surfaces, comprising:

bonding the 3D printed article at the fractured surfaces; and subjecting the bonded 3D printed article to healing at a certain temperature.

15. A recovering method, comprising:

cutting the printed 3D article of claim 1 into pieces; and performing hot-pressing treatment to recover the composition.

16. A method for reusing the photocuring 3D printed linear polymer article according to claim 3, comprising:

dissolving the 3D printed linear polymer article in the monofunctional photosensitive resin monomer by stirring at a certain temperature to form a solution.

17. A cyclic printing method, comprising:

a) dissolving the 3D printed linear polymer article according to claim 7 in the monofunctional photosensitive resin monomer by stirring at a certain temperature to form a solution;

b) blending the solution with the photoinitiator to obtain a resin solution;

c) optionally, adding the optional filler to the resin solution to obtain a mixed dispersion; and d) subjecting the resin solution obtained in step b) or the mixed dispersion obtained in the step c) to photocuring 3D printing to obtain a second photocuring 3D printed linear polymer article.

\* \* \* \* \*